United States Patent
Lindenau et al.

(10) Patent No.: US 8,658,054 B2
(45) Date of Patent: Feb. 25, 2014

(54) MIXTURE FOR PREVENTING SURFACE STAINS

(75) Inventors: Rene Lindenau, Radevormwald (DE); Lars Wimbert, Schwelm (DE)

(73) Assignee: GKN Sinter Metals Holding GmbH, Radevormwald (DE)

( * ) Notice: Subject to any disclaimer, the term of this patent is extended or adjusted under 35 U.S.C. 154(b) by 1 day.

(21) Appl. No.: 13/180,933

(22) Filed: Jul. 12, 2011

(65) Prior Publication Data
US 2012/0001129 A1    Jan. 5, 2012

Related U.S. Application Data

(63) Continuation of application No. PCT/EP2010/000092, filed on Jan. 12, 2010.

(30) Foreign Application Priority Data

Jan. 13, 2009  (DE) .......................... 10 2009 004 829

(51) Int. Cl.
*C09K 3/00* (2006.01)
*H01B 1/22* (2006.01)
*C04B 35/532* (2006.01)

(52) U.S. Cl.
USPC .......... 252/182.12; 252/512; 501/87; 501/92; 501/94; 501/96; 501/126; 501/127; 264/49; 264/51; 264/434; 264/405

(58) Field of Classification Search
USPC .......... 501/87, 92, 94, 96, 126, 127; 252/512, 252/182.12; 264/49, 51, 434, 405
See application file for complete search history.

(56) References Cited

U.S. PATENT DOCUMENTS

| | | | | |
|---|---|---|---|---|
| 4,883,497 | A * | 11/1989 | Claar et al. | 29/623.5 |
| 2003/0000340 | A1 * | 1/2003 | Mende et al. | 75/351 |
| 2003/0094076 | A1 * | 5/2003 | Hosoe et al. | 75/348 |
| 2003/0109588 | A1 * | 6/2003 | Schmidt et al. | 516/20 |
| 2003/0220424 | A1 | 11/2003 | Schofalvi | |
| 2004/0138049 | A1 * | 7/2004 | Yasrebi et al. | 501/127 |
| 2007/0006680 | A1 * | 1/2007 | Dover et al. | 75/331 |

FOREIGN PATENT DOCUMENTS

| | | | |
|---|---|---|---|
| DE | 4021739 | A1 | 1/1992 |
| EP | 0206685 | B1 | 12/1986 |

* cited by examiner

*Primary Examiner* — Joseph D Anthony
(74) *Attorney, Agent, or Firm* — Baker & Hostetler LLP

(57) ABSTRACT

In order to achieve the object of providing a mixture by means of which, in particular, sintered moldings can be obtained that are virtually free of surface stains produced by soot particles, a mixture is proposed which comprises at least one pressing aid and at least one additive, wherein the additive is selected from a group of substances which have releasable carbon dioxide.

4 Claims, 1 Drawing Sheet
(1 of 1 Drawing Sheet(s) Filed in Color)

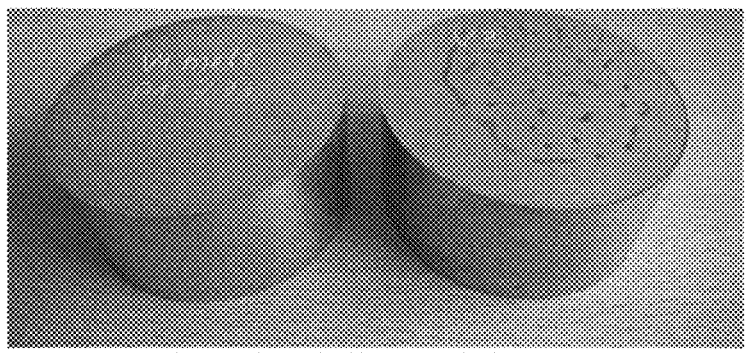

MIXTURE FOR PREVENTING SURFACE STAINS

CROSS-REFERENCE TO RELATED APPLICATIONS

This application is a continuation of International Application No. PCT/EP2010/000092, filed Jan. 12, 2010, which claims the benefit of German Application No. 10 2009 004 829.4, filed Jan. 13, 2009, the entireties of which are incorporated herein.

TECHNICAL FIELD

The present invention relates to a mixture to be added to sinterable powder compositions, such as powder metallurgical compositions, which comprises at least one pressing aid and at least one further specialized additive. The invention further relates to sinterable powder compositions containing the mixture, as well as to procedures to manufacture the mixtures.

BACKGROUND

Sintered moldings, whether made out of metallic or plastic components, and methods of making sintered molding, for instance, common compression molding or plastic and metal injection molding (MIM), are used in many applications in the industry since, on the one hand, even complex moldings with a high accuracy of shape and high stability can be manufactured in large-scale production and, on the other hand, a lot of energy is saved with the application of sintering processes. At first, a preformed molding, also called green compact, is generally manufactured on the basis of a sinterable powder mixture, which is converted to a stable and true-to-form molding in a sintering phase. Pressing aids are typically used in the sinterable powder mixture. Such aids often are based on compounds such as metal stearates, amide waxes, including fatty acid amides or the like, which improve the conductivity and compressibility, and provide the green compact with a certain molding stability, particularly green strength, for the further processing prior to and during the sintering step. As a general rule, the pressing aid is removed prior to the sintering step or is burned out of the part during the sintering step.

The preformed green compact obtains an increased stability and rigidity during the sintering process as a result of binding of the individual powder particles to each other. Depending on the composition of the mixture used, the sintering conditions, and density of the components, pressing aids with very good lubricating effects can result in creation of carbon ("soot") with resultant stains on the surface of the sintered part. These are presumably generated by pyrolysis of the pressing aids used on the component surface, either during the actual sintering step or in a preceding heating step with temperatures clearly above the melting point of the pressing aid, both of which steps are intended to remove the pressing aid("debinding").

US 2004/0138049 A1 reveals an improved composition consisting of an agitating agent, which would be suitable for metallic powder injection pressing. The agitating agent is a gaseous agent, which makes internal agitation available, which facilitates solvent-based binder extraction. Preferred agitating agents are selected from a group consisting of metallic bicarbonates, carbonates from metals of group I of the chemical periodic system, metal carbonates, metal bicarbonates and combinations of the same.

US 2003/0220424 A1 reveals a binder composition consisting of an aliphatic polyester-polymer, an ethylene bisamide wax and a guanidine moist agent. This mixture can also consist of an accelerant for the debinding process, which is preferably selected from organic or inorganic peroxides, azo-compounds or metallic compounds.

Hence, the present invention provides a mixture, particularly for sinterable powder mixtures, which produces less surface staining.

BRIEF DESCRIPTION OF THE DRAWINGS

The file of this patent or application contains at least one drawing/photograph executed in color. Copies of this patent of patent application publication with color drawing(s)/photograph(s) will be provided by the Office upon request and payment of the necessary fee.

FIG. 1: Is a visual presentation of a molding with surface stains manufactured with a pressing aid according to the state of the art, as well as a sintered molding manufactured according to the invention having no surface stains.

DETAILED DESCRIPTION OF ILLUSTRATIVE EMBODIMENTS

The present invention is directed to addition mixtures, particularly useful in producing sintered moldings, which comprise at least one pressing aid and at least one additive, wherein the additive is a material that includes purgeable carbon dioxide.

The pressing aids useable in the mixture of the present invention can be any of the known aids that improve the conductivity and/or compressibility of powder particles, that provide the green compact with a certain molding stability for further processing, and/or that lead to a change and/or improvement of the ease of flow of the powder to be compacted. Such pressing aids as used in the present invention generally are organic materials or metallic salts of organic materials that contain carbon that is released during pyrolysis. Particularly preferred pressing aids within the scope of the invention are selected from the group consisting of polyvinyl acetates, fatty acid alcohols and/or their salts, wax, substances similar to wax, polyethylene glycol, polyethylene oxide, esters and/or salts from fatty acids, amines, amides and/or amide wax and/or their salts, including fatty acid amides and mixtures of said substances. Substances similar to wax in the sense of the present invention are those which possess at least 4, preferably at least 5 of the following characteristics:

a. kneadable, solid or crumbly at 20° C.
b. coarse or fine crystalline
c. translucent to opaque, however not glass-like
d. meltable at 40° C. without decomposition
e. slightly liquid just above the melting point (low viscosity)
f. strongly temperature-dependent consistency and solubility
g. polishable under light pressure Carnauba wax in the sense of the present invention is plant wax, which generally features a density in the range of about 0.99 g/cm$^3$ to about 0.999 g/cm$^3$ and a melting point preferably in the range of about 83° C. to about 86° C. Carnauba wax is extracted particularly from the leaves of the Brazilian fan palm. Exemplary carnauba wax contains about 85 wt. % of an ester of white crystalline wax, ω-hydroxycarbon acids and cinnamic acids, with wax alcohols and diols in relation to the overall quantity of the wax and of the wax mixtures.

Furthermore, carnauba wax can also contain about 5 wt. %, in relation to the overall quantity of the wax, of free white crystalline wax, particularly carnauba cerotic acids and, in addition, alcohols and diols, hydrocarbons and mineral nutrients. Mixtures of varying carnauba wax in the sense of the present invention can be used as well.

It is preferable that the carnauba wax, in the sense of the present invention, features a iodine value within a range of about 8.5 to 10.5 and, additionally, the acid value of the carnauba wax, in the sense of the present invention, is preferably within a range of about 1 to about 4 and the saponification value within a range of about 70 to about 83.

Amides, including fatty acid amides (especially monoamides from saturated and/or single or multiple unsaturated fatty acids) and amide wax, in the sense of the present invention, are preferably selected from the group consisting of primary, secondary and/or tertiary amides. It is further preferred that fatty acid amides include at least one alkyl radical with 4 to 25 carbon atoms, preferably 5 to 21 carbon atoms, in the sense of the present invention. A primary amide with an alkyl radical of 5 to 21 carbon atoms is particularly preferred. In the sense of the present invention, mixtures of varying amides can be added to the pressing aid wherein the mixture preferably consists exclusively of primary amides. Particularly the chain length of the alkyl radical can be within a range of 4 to 25, preferably 5 to 21 carbon atoms, in the mixture.

In the sense of the present invention, it is preferable that esters and/or ester wax or their derivatives, especially esters from monocarbon acids with 5 to 21 carbon atoms and single or multi-value alcohols, particularly glycerin monostereate or derivates thereof are used as the pressing aids.

The specialized additives that are used in conjunction with the pressing aid in the mixtures of the present invention are substances which include purgeable carbon dioxide; that is, they split off or release carbon dioxide under the influence of added energy, such as thermal or radiation energy. It is thought that the energy causes the additive to degrade or to undergo a chemical reaction, although generally not combustion with oxygen, that releases carbon dioxide. In the sense of the invention, it is particularly preferred that the additive is selected from a group of substances which are able to reduce surface stains, which contain soot particles, on sintered moldings manufactured out of, for example, a plastic and/or metallic material. Reduction is to be understood here in the sense of a decrease in the surface stains, and not a chemical reduction reaction.

According to the invention, the additive is selected from the group consisting of organic carbon acids and/or their derivatives. It would also be possible to use organic and/or inorganic salts of the carbon acids. The additive is preferably a monomer, as opposed to an oligomer or polymer. Derivatives of organic carbon acids preferably include their esters or anhydrides and also hydrates of the corresponding acids. For instance, citric acids can be used in pure form but also as citric acid monohydrate. It is particularly preferable that the carbon acids and/or their derivatives used as additives within the scope of the invention are selected from the group consisting of compounds with at least two carboxy groups, preferably at least three, and preferably four carboxy groups. According to the invention, preference is given to carbon acids selected from the group consisting of citric acids, oxalic acids, malic acids and/or malonic acids and/or their derivatives, including hydrates, wherein it is particularly preferable to use citric acid monohydrates. But is also possible to use, for instance, diammonium carbonate, ammonium hydrogen carbonate, sodium hydrogen carbonate or similar inorganic salts of the carbon acids, but also organic salts of the same.

Sinterable moldings in the sense of the present invention are generally made completely out of a sinterable material. However, sinterable moldings within the present invention also include composite parts made from a sinterable aluminum, ceramic, or iron-containing powder mixtures in a compound structure containing an underlying cast core made from, for instance, cast steel, sintered or compact, or from massive aluminum cast. Alternatively, the composite part can also, for instance, simply feature a sintered layer, which is, for example, made out of an aluminum or ceramic mixture, on the front sides or its surface, whereas the basic structure is manufactured as, for instance, steel or cast iron, sintered or compact. The sintered moldings can thereby be calibrated and/or cured in heat. Plastic and/or metallic materials to manufacture sintered moldings in the sense of the present invention are preferably sinterable powder and mixtures of metallic, ceramic and/or plastic components. For instance, lowly alloyed steels, chrome-nickel steels, bronzes, nickel base alloys such as Hastalloy, Inconel, metal oxide, metal nitride, metal silicide or the like, only or in any mixture with one another, can be used. The powder used, and its particle size, depends on the respective purpose of use wherein the targeted expert is aware of the choice. The alloy 316 L, 404 L, Inconel 600, Inconel 625, Monel, Hastalloy BX and/or C as well as Distalloy DH1 are examples of ferrous powders. Lowly alloyed steel powder from simple Fe—C-mixtures to the point of for instance Distalloy HP (Hööganas AB, Sweden) are particularly preferred. It is obvious that mixtures of the aforementioned powders can be used as well.

The addition mixture according to the invention aids in the suppression or complete reduction of soot-based surface stains on sintered moldings. It is believed that carbon dioxide released from the additive during the heating sintering step, or in a dewaxing step, reacts with soot particles contained in the surface particles and converts the soot to gaseous carbon monoxide. Sintered moldings, which are manufactured with the use of the mixture according to the invention are essentially, if not entirely, stain free and meet even the highest optical requirements.

It is particularly preferred that the mixture according to the invention contains the carbon acid additive in a quantity of about 1 wt. %, preferably about 3 wt. % to about 90 wt. %, in relation to the overall quantity of the mixture. It is especially preferable that the additive is contained in a mixture of about 8 wt. % to about 80 wt. %, and furthermore preferred in a quantity of about 10 wt. % to about 75 wt. % in the mixture according to the invention.

Insofar as ranges or numeric values have been specified in the present invention, the addition of the word "about" clarifies that the upper and lower boundaries do not concern absolute values. Instead, it is obvious for the expert that the success of the present invention can still be achieved with deviations from the numerically defined upper and lower limits. The deviating range can thereby differ by up to 5% from the stated upper and/or lower limits.

It is particularly preferable in the sense of the present invention that the pressing aid is selected from the group consisting of at least carnauba wax, preferably and additionally at least one primary fatty acid amide and/or a primary fatty acid ester. In a particularly preferred embodiment of the present invention, the mixture contains carnauba wax as pressing aid and citric acids or their derivatives, preferably citric acid monohydrate, as additive in addition to further components, wherein preferred additional components such as aerosile, graphite, molybdenum sulfide, etc., which are known to the expert in the field of powder metallurgy, can be present.

Furthermore, the present invention relates to a mixture concentrate, which is characterized by the fact that it possesses at least an additive in a quantity of about 35 wt. % to about 90 wt. % in relation to the overall quantity of the mixture concentrate. Consequently, it is possible to manufacture a "master mixture" which can be supplemented by at least one additional pressing aid. This additional or second pressing aid and pressing aid mixture, respectively, can thereby be identical to the first pressing aid, which is present in the mixture concentrate, and it can be a component of the first pressing aid used, in the event it represents a mixture of varying pressing aids.

It is preferred that the concentrate according to the invention possesses about 50 wt. % of at least one additive, preferably at least about 60 wt. %, even more preferable at least about 65 wt. % of the additive, and at least one pressing aid selected from the group consisting of polyvinyl acetates, fatty acid alcohols and/or their salts, waxes, substances similar to wax, polyethylene glycols, polyethylene oxides, esters and/or salts from fatty acids, amines, amides and/or amide waxes and/or their salts, including fatty acid amides, and mixtures of said substances. It is further preferred that the concentrate according to the invention possesses at least about 50 wt. % of citric acids or their derivatives, preferably citric acid monohydrate, as additive, preferably at least about 60 wt. %, and also preferably at least about 65 wt. % in relation to overall quantity of the concentrate, whereby the residual quantity is formed of carnauba waxes as pressing aid.

Additionally, the present invention relates to a sinterable powder composition that includes the addition mixture according to the invention and/or the mixture concentrate according to the invention. It is further preferred that the sinterable powder composition includes at least a plastic and/or metallic material. In a further preferred embodiment of the present invention, the sinterable powder composition contains at least a plastic and/or metallic material in a quantity of at least 80 wt. % in the mixture, preferably in a quantity of at least about 90 wt. %, and even more preferably in a quantity of at least about 95 wt. %, each time in relation to the overall quantity of the composition. The remaining weight of the composition is the additive mixture and/or mixture-concentrate of the invention and other materials known in the art for use in sinterable powder composition, such as lubricants. The additive mixture and/or mixture-concentrate of the invention (pressing aid and at least one carbon-acid additive) preferably make up about 0.2 wt. % to about 8 wt. %, and more preferably about 0.3 wt. % to about 1.8 wt. %, of the sinterable powder composition.

The addition mixture according to the invention can contain carbon in order to form alloys with the sinterable powder. The amount of carbon is preferably within a range of at least about 0.3 wt. %, and preferably about 0.4% to about 1.4 wt. %, preferably maximum about 3 wt. %, each in relation to the overall quantity of the sinterable powder composition.

In a further preferred embodiment of the present invention, the sinterable composition contains the addition mixture in an amount that provides about 0.005 wt. % to about 2 wt. %, preferably about 0.01 wt. % to about 1.5 wt. % of the specialized additive in the sinterable composition. The sinterable compositions of the invention preferably contain the addition mixture of the invention, which comprises at least one pressing aid and at least one additive, in a quantity of about 0.2 wt. % to about 8 wt. %, preferably in a quantity of about 0.3 wt. % to about 1.8 wt. %, in relation to the overall quantity of the sinterable composition.

In addition, the present invention relates to a process to manufacture an addition mixture according to the invention or a mixture concentrate according to the invention, wherein at least one additive and at least one pressing aid are melted together and, subsequently, the obtained mixture is processed into powder. It is thereby preferred that the mixture is sieved to a powder with a grain size of about <500 μm, and preferably about <200 μm, and furthermore preferred to be about <150 μm. In an alternative manufacturing process in the sense of the present invention, the addition mixture or mixture concentrate according to the invention is manufactured using an initial step in which, at first, a mixture with at least about 30 wt. % of at least one additive, in relation to the overall quantity of the first mixture, of the rest consisting at least of an initial pressing aid, is manufactured, and in a second step, the first mixture is added to at least one second pressing aid. The first and second pressing aid can thereby be different but also identical. At least the initial pressing aid can also represent such a mixture, wherein the second pressing aid can be included in this mixture. Furthermore, the second pressing aid itself can be a mixture of several pressing aids and a component of the same can represent an initial pressing aid or comprised of a mixture of the first pressing aid. Consequently, a mixture concentrate with a high amount of additive is initially manufactured in the case of this alternative process according to the invention. This additive is then is inserted in at least a second pressing aid in a second step. The advantage hereby is that the mixture according to the invention and the mixture concentrate according to the invention can be managed well. The high amount of additives ensures that soot, which can be produced through pyrolysis of the initial pressing aid or pressing aid mixture comprised in the mixture concentrate, can at least be predominantly suppressed but that the surface stains, which are induced by at least a second pressing aid with its pyrolysis or through the pyrolysis of the initial and/or second pressing aid or pressing aid mixture, are also predominantly suppressed based on the high concentration.

However, any other manufacturing method is imaginable to manufacturing the mixture or mixture concentrate according to the invention. For instance, instead of melting substances together, the components that comprise the mixture can simply be mixed warm or the additive, particularly in the form of citric acids or citric acid monohydrate in soluble form, in other words, as a watery solution or solution in another organic solvent, in which at least a pressing aid is inserted and, subsequently, the solvent is vaporized.

Furthermore, the present invention relates to the application of an addition mixture, mixture concentrate or sinterable powder mixture to manufacture sintered moldings, as well as a sintered molding, manufactured with an additional mixture according to the invention, a mixture concentrate according to the invention and/or a sinterable powder mixture according to the invention. Finally, the present invention relates to the use of at least a substance selected from a group consisting of organic carbon acids and/or their derivatives to prevent surface stains, which contain soot particles, on sintered moldings. The corresponding substances are selected according to the invention as described above in the present invention with respect to the additive.

These and additional advantages are further described on the basis of the following examples and figures.

EXAMPLES

At first, a mixture is manufactured a) from carnauba wax with the product name of carnauba wax flakes F (technical use), of Benecke GmbH, Hamburg, in a quantity of 54 wt. %, in relation to the overall quantity of the mixture, with a fatty acid amide wax with a melting point of 150° C. with the product name of LUBA-print wax 467/E of the manufacturer L.B. Bader & Co. GmbH, Rottweil, Germany, in a quantity of 36 wt. % with 10 wt. % citric acid monohydrate as additive, obtained from Acros Organics, Geel, Belgium. The wax components from carnauba wax and fatty acid amide wax is first manufactured separately through joint melting of the carnauba wax and fatty acid amide wax, solidification of the melted substance and with, if applicable, subsequent cooling an confectioning or fractioning of the melted substance into a powder. These wax components were then melted together with the citric acid monohydrate and, subsequently, the mixture obtained was milled after cooling and sieved to a grain size that corresponds to a particle size of <125 μm. This mixture a) mixed with 96.78 wt. of sinterable metallic powder AS1000B of the company Hoeganaes Corp., USA, 2 wt. % of copper, 0.6 wt. % of carbon and 0.02 wt. % of Aerosil®200C of Degussa AG, Dusseldorf, Germany, wherein the mixture a) was added to a quantity of 0.6 wt. %, where the wt. % result and each relate to the overall quantity of the sinterable powder mixture.

The sinterable powder mixture manufactured in this manner, which contains mixture a), was filled in a common pressing tool and pressed in cylinders with a diameter of 60 mm and a height of 30 mm under a pressure of 800 MPa and at a temperature of 65° C. Subsequently, the green compacts obtained in this manner were at first dewaxed at a temperature of 700° C. in a sinter oven, which was designed as a conveyor furnace, and then sintered for 20 minutes to a temperature of 1120° C. After the parts had cooled, the cylinders were removed from the oven and visually inspected. The cylinders obtained in this manner are shown on the left side on FIG. 1 and does not show any surface stains whatsoever.

Furthermore, a comparison test was conducted wherein a mixture b) was manufactured which, when compared with mixture a), does not contain any citric acid monohydrate or other additives according to the invention. Otherwise, cylinders were manufactured as described before under the same conditions. The sintered molding manufacturing in this manner is specified on the right side on FIG. 1 as state of the art and shows surface stains, which contain soot particles.

In addition, a mixture c) was manufactured through melting of 70 wt. % of citric acid monohydrate and 30 wt. % of carnauba wax, each in relation to the overall quantity of this mixture, wherein this mixture, after melting and cooling down, was milled and was sieved to a grain size of <125 μm. As a result, a mixture concentrate according to the invention was obtained. This mixture concentrate according to the invention according to mixture c) was then added as master mixture in a quantity of 14 wt. %, in relation to the overall quantity of the mixture, with 86 wt. %, in relation to the overall quantity of the mixture, a wax mixture, according to mixture a) as described above from a fatty acid amide wax and carnauba wax. The mixture d) manufactured in this manner possesses the additive in a quantity of about 10 wt. % in relation to the overall quantity of the mixture. The carnauba wax of mixture c) was thereby identical to the carnauba wax of mixture a). The sintered moldings manufactured from this mixture also did not show any surface stains.

Advantageously, the present invention makes available a mixture, a mixture concentrate and a sinterable powder mixture by means of which sintered moldings can be manufactured that also meet high optical demands.

What is claimed:

1. A sinterable powder composition comprising an addition mixture for use in a sinterable powder composition wherein the addition mixture comprises:
   at least one pressing aid and at least one additive, wherein the additive comprises purgeable carbon dioxide, said additive being citric acid or a derivative thereof, in an amount of about 50 wt. % in relation to the overall weight of the addition mixture, and the residual quantity of the addition mixture is carnauba wax.

2. The sinterable powder composition according to claim 1, comprising at least one sinterable plastic or metallic powder material.

3. The sinterable powder composition according claim 1, comprising at least 80 wt. % of at least one plastic or metallic material, in relation to the overall quantity of the sinterable composition.

4. The sinterable composition according to claim 1, wherein the addition mixture is present in a quantity such that the sinterable composition contains about 0.005 wt. % to about 2 wt. % of the at least one additive.

* * * * *